(12) United States Patent
Chu et al.

(10) Patent No.: US 8,656,029 B2
(45) Date of Patent: Feb. 18, 2014

(54) MULTICAST SESSION SETUP IN NETWORKS BY DETERMINING A MULTICAST SESSION PARAMETER BASED ON A PRE-EXISTING UNICAST SESSION PARAMETER

(75) Inventors: Thomas P. Chu, Englishtown, NJ (US); Tewfik Doumi, Edison, NJ (US); Kenneth C. Budka, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 79 days.

(21) Appl. No.: 13/174,000

(22) Filed: Jun. 30, 2011

(65) Prior Publication Data

US 2013/0007287 A1 Jan. 3, 2013

(51) Int. Cl.
*G06F 15/16* (2006.01)
(52) U.S. Cl.
USPC .......................................... 709/227; 709/228
(58) Field of Classification Search
USPC ................................................ 709/227–228
See application file for complete search history.

(56) References Cited

U.S. PATENT DOCUMENTS

| 5,832,229 | A  | * | 11/1998 | Tomoda et al. | 709/227 |
| 6,097,720 | A  | * | 8/2000  | Araujo et al. | 370/355 |
| 6,144,651 | A  | * | 11/2000 | Rinchiuso et al. | 370/335 |
| 6,188,691 | B1 | * | 2/2001  | Barkai et al. | 370/390 |
| 8,483,205 | B2 | * | 7/2013  | Ai et al. | 370/350 |
| 2004/0181692 | A1 | * | 9/2004  | Wild et al. | 713/201 |
| 2005/0122976 | A1 | * | 6/2005  | Poli et al. | 370/392 |
| 2009/0073911 | A1 | * | 3/2009  | Cheon et al. | 370/312 |

* cited by examiner

*Primary Examiner* — Lance L Barry
(74) *Attorney, Agent, or Firm* — Wolff & Samson PC (57) ABSTRACT

Methods, systems, and apparatuses dynamically setting up bearers to support Internet protocol (IP) multicast traffic in various networks are provided. The method may be performed by joining an IP multicast group in response to receiving a request to initiate an IP multicast transmission session within a network, the request including at least one transmission session parameter; determining at least one synchronization area within the network for the IP multicast transmission session of the request based at least in part on the at least one transmission session parameter; and initiating an IP multicast transmission session between an application server and at least one user equipment end-point within the at least one synchronization area.

27 Claims, 7 Drawing Sheets

MULTICAST SESSION SETUP IN NETWORKS BY DETERMINING A MULTICAST SESSION PARAMETER BASED ON A PRE-EXISTING UNICAST SESSION PARAMETER

FIELD OF THE INVENTION

This invention relates to a method to dynamically set up logical connections to support Internet protocol (IP) multicast traffic in Long Term Evolution (LTE) networks.

BACKGROUND

The $3^{rd}$ generation (3G) mobile telecommunications system is a set of standards for the current generation of wireless telecommunications services, including mobile video, voice, and Web access applications. The Long Term Evolution (LTE) project was initiated by the $3^{rd}$ Generation Partnership Project (3GPP) to address the next generation of 3G technology and architecture. LTE includes a number of improvements over the current generation of 3G systems including spectral flexibility, flexible wireless cell size and an all Internet protocol (IP) architecture. In particular, the IP architecture enables easy deployment of services such as video, voice, Web access, etc. The IP architecture also allows for simpler inter-working with other fixed and mobile networks.

In an LTE network, the IP architecture allows a wireless user equipment end-point (UE) to send and receive user packets through its designated public data network gateway (PDN-GW). The data path between the UE and the PDN-GW goes through an enhanced base station (eNodeB) and a server gateway (S-GW). When a UE data packet is received, the PDN-GW forwards the data packet to its intended destination. The PDN-GW also accepts packets on the behalf of the UE, and then forwards the arriving packets to the UE.

The logical connection between the UE and the PDN-GW is referred to as the Evolved Packet System (EPS) bearer (sometimes referred to herein as a "bearer"). Associated with each bearer are one or more traffic flow templates (TFT) and a quality of service (QoS) profile.

The TFT describe the criteria for whether a packet belongs to a bearer or not. The most commonly used TFT parameters are the IP addresses of the source and destination, the port numbers at the source and destinations, and the protocol type. Typically, all of these parameters are part of the header information of a packet.

A QoS profile governs how the packets of a bearer should be treated by the network. As a UE may have multiple concurrent sessions, each with different QoS needs, multiple bearers can be set up between a UE and the PDN-GW, each supporting a different QoS. Further, multiple sessions of the same QoS class can be mapped onto the same bearer.

When a UE is first attached to the network, a default bearer, with a prescribed QoS, may be set up between the UE and the PDN-GW. Other bearers, referred to as dedicated bearers, can be set up and torn down on an "as needed" basis.

Multicast applications are one important class of applications for LTE networks where traffic from a source may be sent to a selected plurality of UEs or to all UEs (in broadcast mode). Examples of multicast applications are conference calls, push-to-talk (PTT) group calls, and multiple end-point media distribution (e.g., video conferences).

Multicast applications can be supported through the use of multiple unicast logical connections, however, this is not efficient in terms of both processing at the source and network utilization. With unicast, the source has to send the same packet to each destination. This increases the need of processing power at the source. For example, the same packet may traverse the same link and appear multiple times at the same network nodes, consuming bandwidth, particularly for the access link between the source and the network.

Therefore, in order to support multicast applications, multicast routing protocols have been developed for activating the routers in IP networks. For example, a multicast routing protocol may allow a router to inform its neighbors of the multicast traffic that it is currently receiving; and the multicast traffic that it wants to receive.

The multicast routing protocol may also regulate the propagation of multicast traffic between routers in IP networks. Currently, one popular multicast routing protocol is Protocol Independent Multicast-Sparse Mode, RFC 4601 (PIM-SM). In general, PIM-SM is very efficient in bandwidth as a router (i) only forwards the traffic of a multicast group to a neighbor if the neighbor requests such traffic, and (ii) may request traffic from a multicast group from only one of its neighbors. PIM-SM also supports general multicast in that it allows any member of a multicast group to transmit (i.e., be a source), even concurrently. Another currently popular multicast routing protocol is Source Specific Multicast, RFC 4607 (SSM), where a multicast group has only a single source.

While useful for their intended purposes, multicast routing protocols such as PIM-SM and SSM are complex and require the support of a substantial amount of processing power. For example, PIM-SM and SSM multicast packets are often duplicated at routers, which tends to require additional processing for managing the increased throughput. Therefore, a method is needed for setting up IP multicast transmissions over an LTE network that would improve the throughput of a router.

SUMMARY

A system, method and article of manufacture to dynamically set up bearers to support Internet protocol (IP) multicast traffic in various networks is proposed. In one embodiment, the improved method comprises joining or initiating an IP multicast group in response to receiving a request to initiate an IP multicast transmission session within a network, the request including at least one transmission session parameter, determining at least one synchronization area within the network for the IP multicast transmission session of the request based at least in part on the at least one transmission session parameter, and initiating an IP multicast transmission session between an application server and at least one user equipment end-point within the at least one synchronization area.

In accordance with an embodiment, the method further comprises establishing a tunnel between the application server and the at least one synchronization area for the IP multicast transmission session.

In accordance with an embodiment, the method further comprises transmitting configuration information regarding the IP multicast transmission session to at least one user equipment end-point within the network; and receiving location information for a user equipment end-point within the network, wherein the user equipment end-point's location information may be used to adjust the boundary of at least one synchronization area, and wherein the at least one synchronization area comprises a single frequency network.

In accordance with an embodiment, the method further comprises initiating a transmission session parallel to a pre-existing transmission session, wherein at least one communication packet is transmitted in both the preexisting transmission session and the parallel transmission session; storing a sequence number for a first packet of the parallel transmission session; storing a sequence number for a received packet of the preexisting transmission session; and comparing the values of the stored sequence numbers.

These and other features of embodiments of the invention will be apparent to those of ordinary skill in the art by reference to the following detailed description and the accompanying drawings.

DETAILED DESCRIPTION

Figure 1:
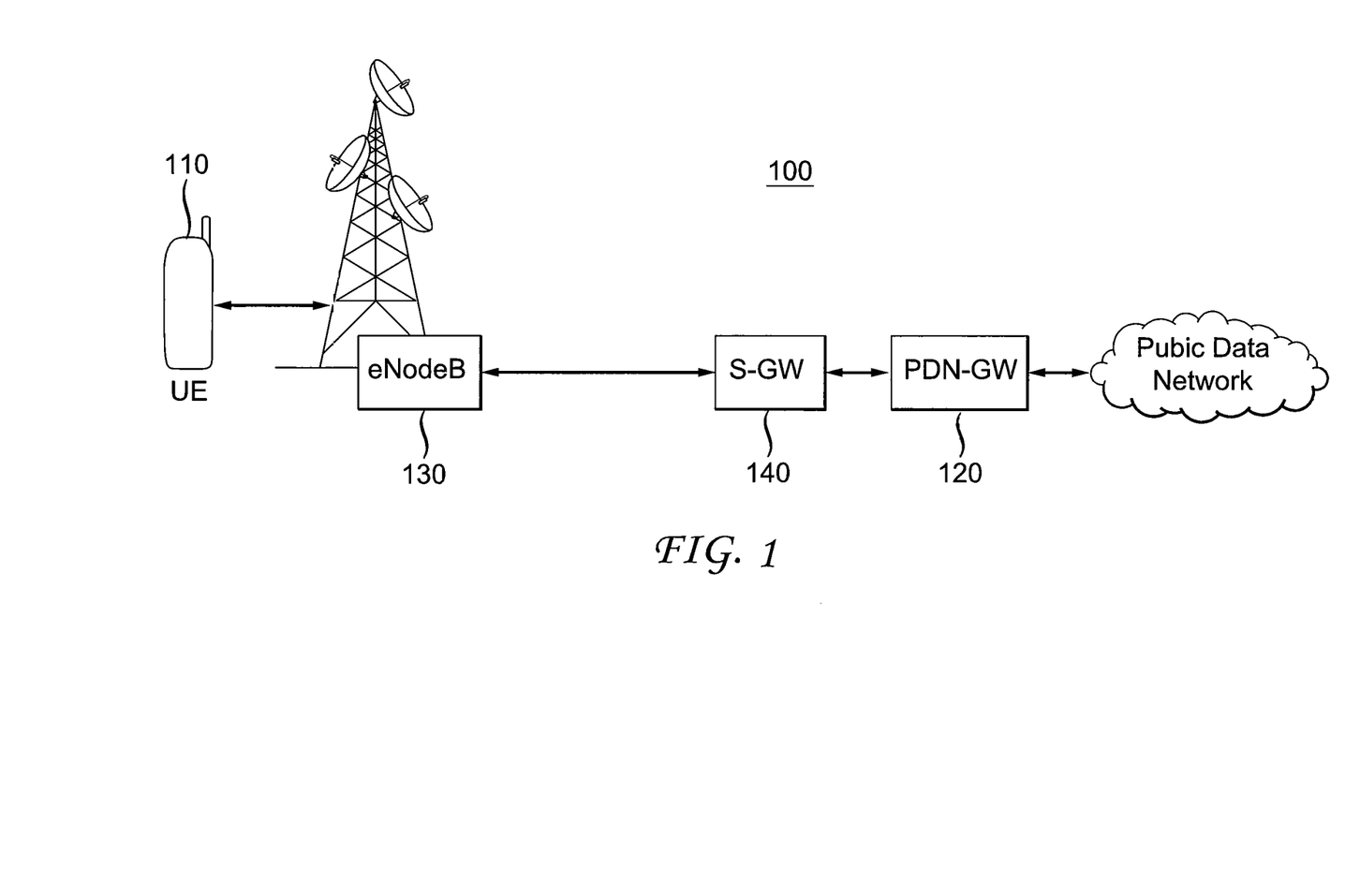
FIG. 1 shows the data path for bearer unicast messages in an LTE network.

A system and method for dynamic multicast session set up can help to support IP multicast traffic in various networks. FIG. 1 shows the data path for bearer unicast messages in an LTE network. In one embodiment, a user equipment endpoint (UE) 110 comprising a wireless transceiver sends and receives data packets through its designated public data network gateway, PDN-GW 120. The data path between the UE 110 and the PDN-GW 120 goes through the eNodeB base station 130 and the server gateway, S-GW 140. When a data packet is received, the PDN-GW 120 then forwards the data packet to its intended destination in a public data network 150. The PDN-GW 120 may also accept data packets on the behalf of the UE 110, and then forward the arriving data packets to the UE 110.

Figure 2:
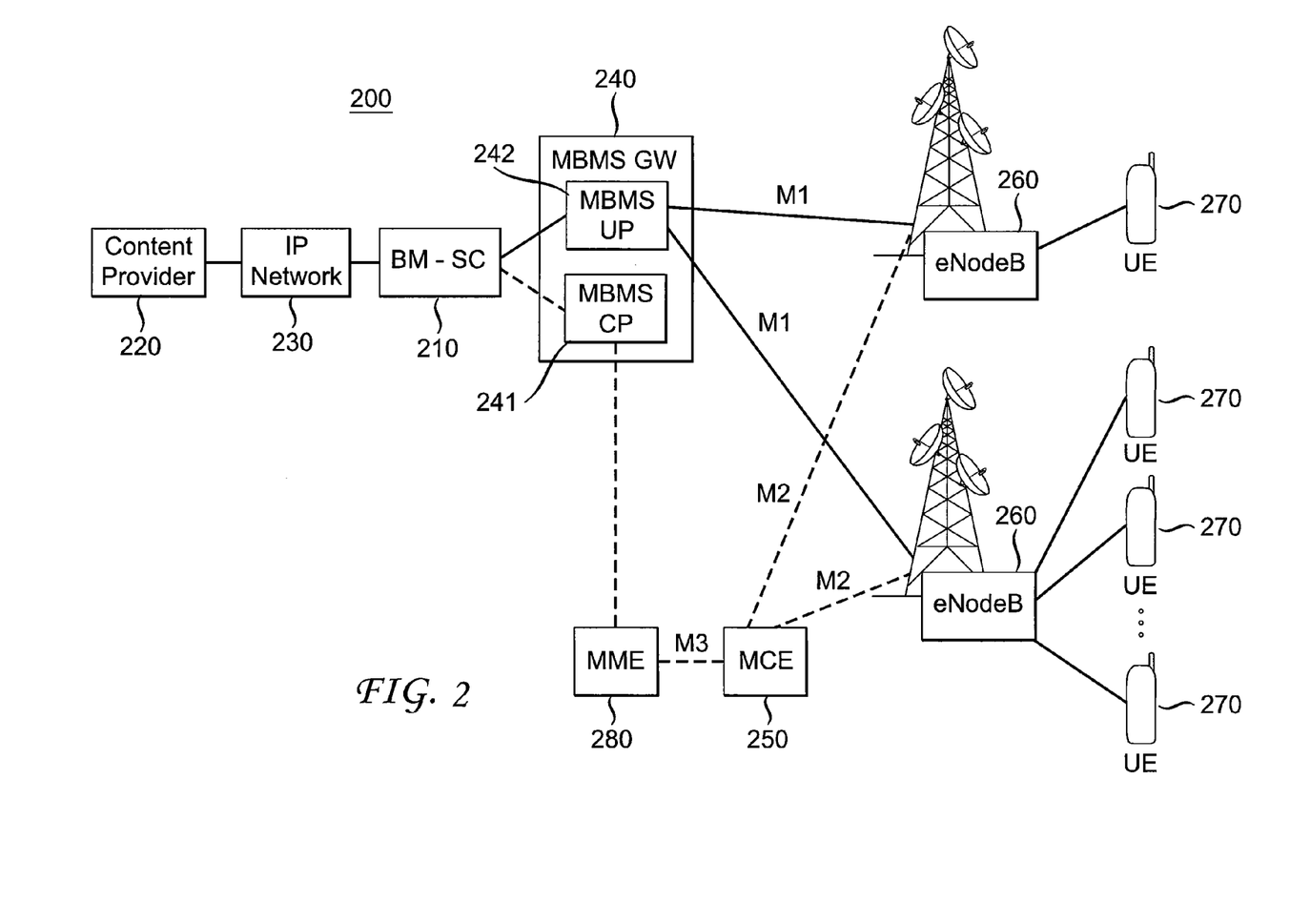
FIG. 2 is an illustration of the logical architecture of a network that supports eMBMS.

In another embodiment, an LTE network may support multicast/broadcast applications via the enhanced Multimedia Broadcast Multicast Service (eMBMS) protocol. FIG. 2 is an illustration of the logical architecture of a network that supports eMBMS.

A Broadcast Multicast Service Center (BM-SC) 210 is included for receiving IP multicast packets (originating at a content provider 220) from the IP network 230 by joining an appropriate IP multicast group. For example, when an IP multicast packet is received, the BM-SC 210 may provide announcements and scheduling of the eMBMS services and deliver the IP multicast packets to the LTE network.

Further, an MBMS gateway (MBMS GW) 240 may be connected to the BM-SC 210. In one embodiment, the MBMS GW 240 consists of two logical parts: a control part (MBMS CP) 241 which handles the session control signaling of the set up and release of the bearers that supports the IP multicast traffic; and a user part (MBMS UP) 242 that distributes the IP multicast traffic to a multi-cell coordination entity (MCE) 250 through a multi-cell management entity (MME) 280.

The MCE 250 may provide information to one or more eNodeB base stations 260 to setup, release, or modify a MBMS session. Although not shown, the MBMS GW 240 can be connected to a plurality of MCEs 250 in the same manner as depicted in FIG. 2. In addition, a plurality of UEs 270 may be connected to each of the eNodeB base stations 260.

In one embodiment, eMBMS multicast or broadcast transmissions may be implemented as multi-cell wireless transmissions by employing a synchronous frequency network mode of operation referred to as a Multimedia Broadcast Single Frequency Network (MBSFN). In an MBSFN, eMBMS data may be transmitted within a narrow frequency range almost simultaneously over the air from multiple, tightly synchronized cells over the same block of allocated transmission time. As a result, a UE 270 may receive multiple versions of the same transmission in an MBSFN, but with different delay. However, since the difference in delay is small, the UE 270 may treat the different transmissions as multi-path components of the same transmission. As such, a significant gain in spectral efficiency can be achieved in an MBSFN.

An area where all the eNodeB base stations 260 are synchronized for MBSFN may be referred to as an MBSFN synchronization area. In one embodiment, a UE 270 may roam from one eNodeB base station 260 to another eNodeB base station 260 within the same eMBMS synchronization area without service interruption. A group of cells within an eMBMS synchronization area that participate in an eMBMS transmission may be referred to as an eMBMS area. In various embodiments, an eMBMS area may support multiple instances of services, each with different sets of content for delivery to all the eNodeB base stations 260 within the area. As such, although eMBMS areas may be independent of each other, they may also overlap.

The eMBMS area also includes various interfaces M1, M2, and M3 between the components. For example, the M1 interface may be adapted for user traffic between the MBMS GW 240 and the one or more eNodeB base stations 260. In one embodiment, the M1 interface may include a SYNC protocol which ensures that a packet is transmitted by all the eNodeB base stations 260 within a synchronized area at about the same time. In another embodiment, the M2 and M3 interfaces are adapted for session control signaling between the MCE 250 and the one or more eNodeB base stations 260, and between the MME 280 and the MCE 250, respectively. In one embodiment, the MME 280 may be connected to a plurality of MCEs 250, just as the MCE 250 may be connected to a plurality of eNodeB base stations 260.

Figure 3:
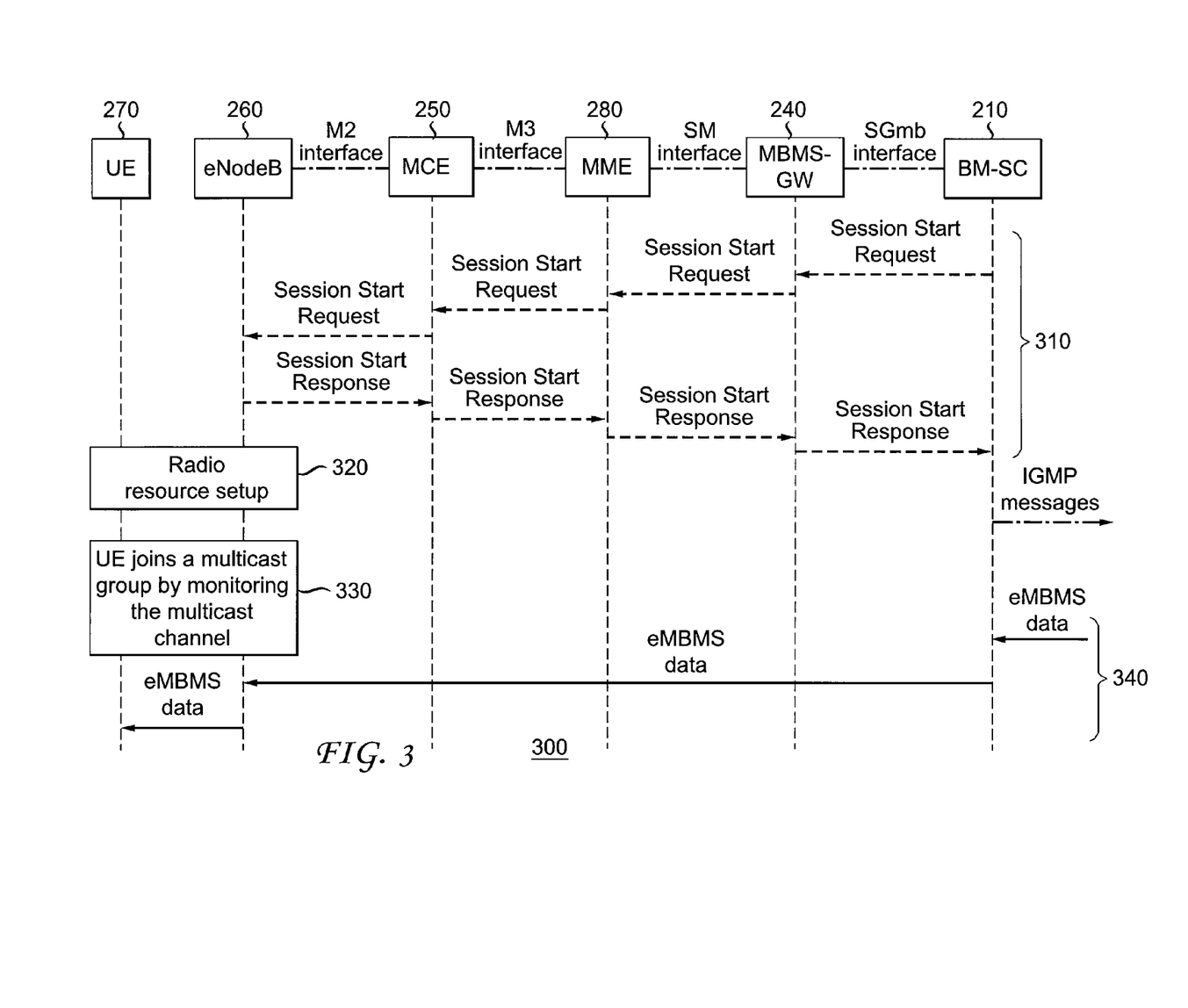
FIG. 3 is a call-flow illustration showing a multicast session setup in an eMBMS network.

FIG. 3 is a call-flow illustration showing a multicast session setup in an eMBMS network between the BM-SC 210 and one or more eNodeB base stations 260. In one embodiment, a command to setup a multicast session 310 may have a common name, such as "MBMS session start request", over all of the interfaces. In one embodiment, the command to setup a multicast session 310 may be replied to by the receiving eNodeB with a response having a common name, such as "MBMS session start response", over all of the interfaces. Alternatively, the content and structure of the messages may be slightly different over different interfaces.

In various embodiments, over-the-air-link, multicast control information is broadcast to the UEs 270 through a multicast control channel (MCCH) that carries a configuration message, MBSFNAreaConfiguartion. The MBSFNAreaConfiguartion message may contain the details of a physical multicast channel, or radio bearer, for each MBSFN area. The MBSFNAreaConfiguartion message may also provide information on the list of active sessions in an area. For example, the information on the MCCH may be carried as part of a general information broadcast over a broadcast control channel. Then, based on the MBSFN area ID, a UE 270 may acquire the appropriate information, set up its radio resources for the multicast channel 320, and join a multicast session 330 by monitoring for the traffic 340 of a particular IP multicast group.

Figure 4:
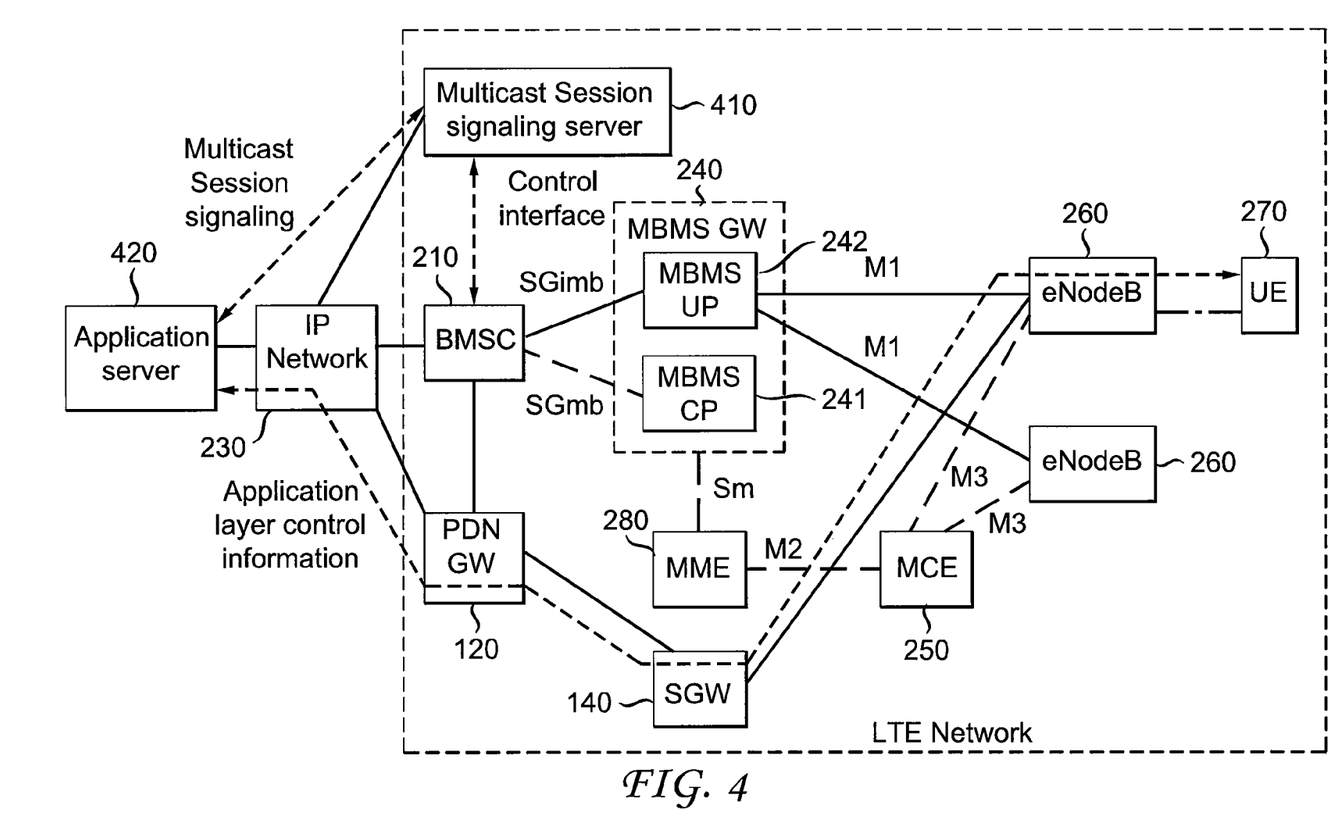
FIG. 4 illustrates a network for implementing multicast applications according to the various embodiments.

FIG. 4 illustrates a network for implementing multicast applications according to the various embodiments. In general, the network 400 is a composite of the two networks as shown in FIG. 1 for unicast traffic and FIG. 2 for multicast traffic, with the addition of a server, referred to as a multicast session signaling server (MSSS) 410. In one embodiment, the MSSS 410 may accept multicast session setup, modification, and/or teardown requests from one or more application servers (AS) 420 connected to the IP network 230. Based on these requests, the MSSS 410 may send a control message to the BM-SC 210 comprising various network parameters. For example, the network parameters may indicate whether to setup or tear down multi-cast sessions; the characteristics of the session (QoS parameters, associated IP multicast addresses, etc.); means to accept media traffic from the application servers; and authentication filtering information.

In IP multicast, each multicast group is assigned a unique IP multicast address. If two multicast groups use the same IP multicast address, their traffic will be intermixed and the applications will not work properly. Therefore, to avoid collisions between IP multicast addresses, the scope of a multicast group may be defined for the span in which the multicast group may operate. For example, multicast packets may not be forwarded outside of a defined span. In one embodiment, multicast scope groups may be defined as local multicast groups that span the local layer 2 network (e.g., the Ethernet); organization multicast groups that operate within the private network of an organizationally (e.g., a company) and reject any packets with this scope from outside organizations; and global multicast groups that span the entire Internet.

In IP v6, the scope is specified in a 4-bit field (referred to as the scope field) in the multicast IP address. In IP v4, the IP multicast address space is subdivided into a number of ranges. For example, each of the above scopes may be assigned one of the ranges.

Figure 5:
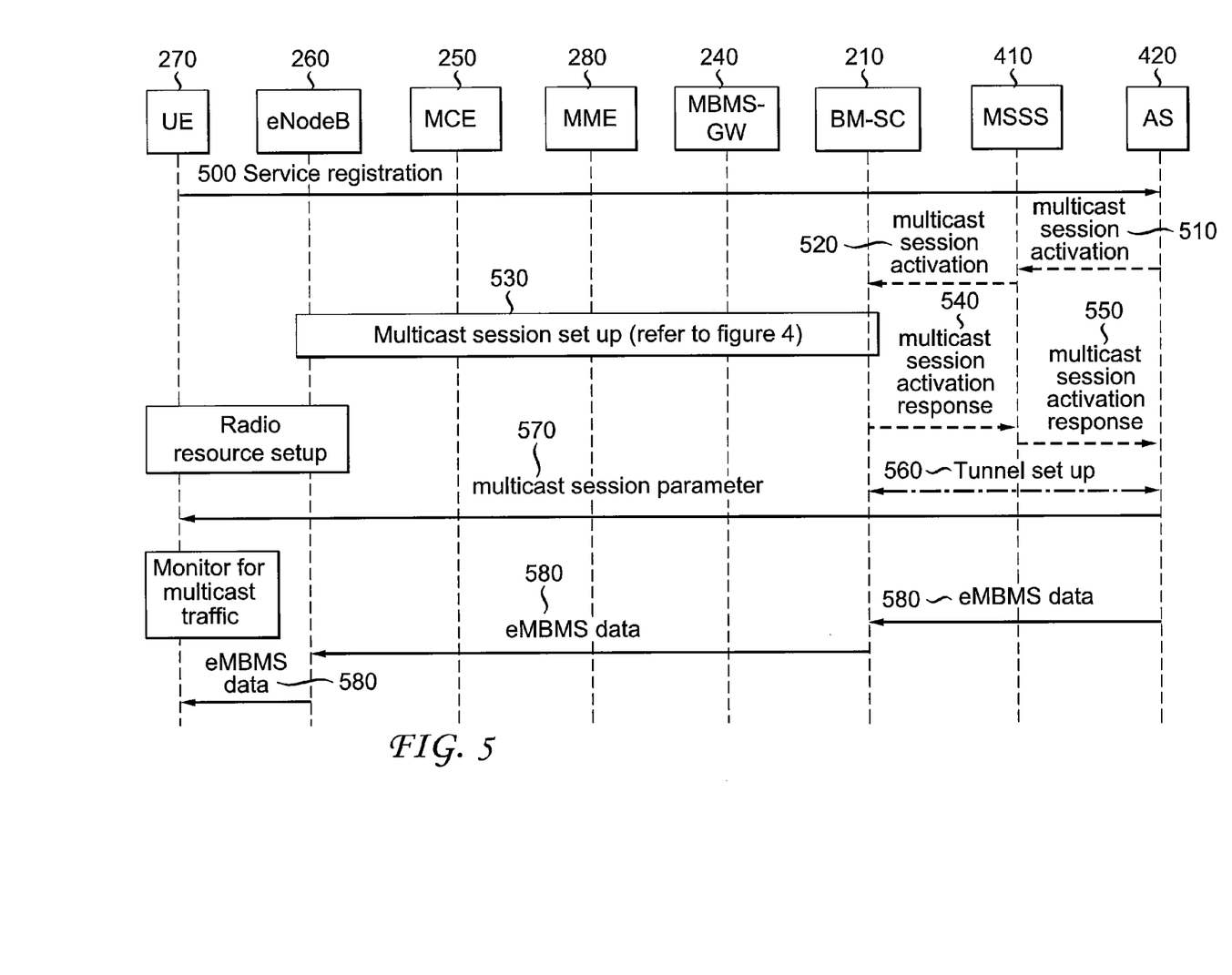
FIG. 5 is a call-flow chart showing the messages for setting up a multicast application according to the various embodiments.

FIG. 5 is a call-flow chart showing the messages for setting up a multicast application according to the various embodiments. In one embodiment, the AS 420 may establish a logical association with the MSSS 410 before the transfer of session management messages between the two, and this logical association can be secured if needed (e.g., by encryption and message authentication).

When a UE 270 wants to join a session for a particular application (e.g., a PTT group), the UE 270 sends a service registration message 500 to the application server 420 that supports the particular application. For example, service registration messages 500 may be sent from the UE 270 to the application server 420 as normal IP unicast packets (i.e. through the S-GW 140 and PDN-GW 120, in a unicast session). In various embodiments, the service registration message 500 may include information such as the identity of the service provider (PLMN ID), the cell ID of the cell where the UE 270 is currently attached or other such information that the UE 270 might acquire from, for example, a general broadcast received from an eNodeB base station 260. When the application server 420 receives the service registration message 500 from the UE 270, the application server (AS) 420 may authenticate the UE 270, and check whether the LTE service provider supports multicast applications.

Assuming that the LTE service provider supports multicast applications and the AS 420 also decides to activate a multicast application for a current transmission session (e.g., there are already a number of registered UEs attached to the same network), the AS 420 will send a multicast session activation request 510 to the MSSS 410. In one embodiment, the multicast session activation request 510 may include information such as: the cell IDs where the UEs 270 are currently resided; the QoS parameters for the multicast session (e.g., maximum bit rate, guaranteed bit rate, grade of service such as delay, etc.); the IP address and port number used by the AS 420 when transmitting packets to the BM-SC 210; and tunneling technologies supported by the AS 420. In one embodiment, instead of the cell ID, the AS 420 may instead encode equivalent information such as the UE identity (e.g., the International Mobile Subscriber Identity (IMSI)) in the request message. Based on the UE identity such as the IMSI, the MSSS 410 can determine, through the LTE network, the ID of the cell where the UE is currently attached. As such, in the description below, the term cell ID should be taken to mean cell ID or equivalent information such as UE identity. Further, in another embodiment, the AS activation request 510 may encode the identity of a cell where no UE belonging to the multi-group is currently attached (e.g., in anticipation of a new member joining the group at a cell location or roaming by existing members).

The MSSS 410, after receipt of the multicast session activation request 510, sends a multicast session activation command 520 to the BM-SC 210 including the identity of the MBSFN synchronous area(s) where a multicast session needs to be set up. The MSSS 410 may determine the synchronous area(s) from the cell ID(s) of the session activation request received from the AS 420. Alternatively, the MSSS 410 may include all of the cell IDs from the request, and the BM-SC 210 may determine the MBSFN synchronous area(s). In addition to the synchronous areas, the multicast session activation command 520 may include the QoS parameters for the multicast session; the IP address and port number used by the application server when transmitting packets to the BM-SC 210; the layer 2 tunnel technology to be used between the AS 420 and the BM-SC 210; and information that allows the BM-SC 210 to authenticate a tunnel setup by the AS 420.

After the receipt of the multicast session activation command 520, the BM-SC 210 initiates a multicast session setup 530 for the MBSFN synchronous areas. To allow for the possibility of roaming by the UEs 270, the BM-SC 210 may extend the coverage area of the multicast session beyond the cells indicated in the request. In one embodiment, the extent of the extended coverage may be application specific. For example, a network operator may set policy at the MSSS 410 (or the BM-SC 210) to indicate the desired coverage area for an application.

In another embodiment, the coverage of the multicast session is indicated by the MBSFN area ID. An MBSFN area can support more than one multicast session, so an existing area can be used to support a new session. However, the QoS parameters (e.g., bandwidth) of the existing multicast bearer may have to be modified to support the new session. As such, a new service area may also be created to support the new session.

After the completion of the multicast session setup process 540, the BM-SC 210 reports the result via a multicast session activation response 540, to the MSSS 410. For example, the report may include the following information: for each synchronous area requested, whether the requested multicast session is setup successfully or not; for each MBSFN synchronous area set up, the MBSFN area ID and its coverage (in terms of cell IDs) of the multicast session; the IP multicast address associated with the multicast group (This address may be a link-local address. The layer 2 network is the logical network from the AS 420 to all the UEs attached to the LTE network. The address is assigned by the BM-SC 210, and should be unique within the LTE network.); and the Temporary Mobile Group Identifier (TMGI) allocated to the multicast session. The TMGI is allocated by the BM-SC 216 to a multicast cast session and is globally unique with respect to the LTE network.

After the receipt of session setup result 540 from the BM-SC 210, the MSSS 410 sends a multicast session activation response 550 to the AS 420 to indicate the synchronous area (s) for the multicast session. This message may include: for each MBSFN area(s), the ID of MBSFN area and its coverage; the IP multicast address associated with this multicast group; for each MBSFN synchronous area, the TMGI of the session; the tunnel technology used to access the BM-SC 210; and information so that the AS 420 can be authenticated for setting up a tunnel between itself and the BM-SC 210. It is possible that, for some cells in the request list, the multicast session is not set up (e.g., multicast resource limitation). Accordingly, the BM-SC 210 message may also identify the UEs 270 attached to these multicast resource limited cells so the AS 420 can use unicast to send data to the UEs 270 outside of the multicast.

In one embodiment, tunnel technology may alleviate the need to support IP multicast at the IP network between an application and the LTE network. However, the use of tunnel technology is not mandatory and, in another embodiment, tunnel technology is not used. For example, the use of tunnel technology may be optional in the case where the IP network between application servers and the LTE network supports IP multicast. Moreover, a mixed mode of operation is also possible (i.e., where some application servers use tunnels, while others do not use tunnels).

As such, after the AS 420 receives the above message, it may initiate a tunnel setup 560 between itself and the BM-SC 210. In one embodiment, the BM-SC 210 may first authenticate the AS 420 based on the credentials provided by the AS 420 and the information provided by the MSSS 410. Then, a tunnel may be setup between the AS 420 and the BM-SC 210 to deliver IP multicast packets using various known tunneling technologies (e.g., MPLS). For example, to ensure interoperability between AS 420 and BM-SC 210, IPSec tunnels (i.e., IP over IP) may be supported by the AS 420 and the BM-SC 210.

The AS 420 then sends a multicast session parameter message 570 to the UEs 270 indicating whether a multicast session has been set up at its cell (e.g., once a tunnel is set up). For UEs 270 at cells where a multicast session has been set up, this message may include: (a) the IP multicast address of the session, (b) the TMGI, and (c) the MBSFN area ID where the requested session has been assigned. With the MBSFN area ID, a UE may acquire the appropriate information on the Physical Multicast Channel (PMCH) from the MCCH. The IP multicast address is used to ascertain whether a packet is associated with the multicast session. The TMGI may be used to ascertain whether the session has been set up in the cell. As noted, for UEs 270 where the multicast session has not been set up, the AS 420 will transmit data to these UEs 270 using unicast.

When the setup process is complete, the AS 420 forwards IP multicast (e.g., eMBMS data) packets 580 to the BM-SC 210 using the tunnel established between the two. As mentioned above, if a tunnel is used, the IP network interconnecting the two entities does not need to support IP multicast.

In one embodiment, a UE 270 will periodically update the AS 420 on its current location (the cell ID). Also, when a UE 270 decides to leave the multicast session, it will send a message to AS 420 that it is leaving the session. With these two updates, the AS 420 may estimate the number of UEs 270 that are actively receiving multicast traffic in a cell for a particular session, and periodically communicate such information to the MSSS 410. With this information, the MSSS 410 may modify the multicast distribution tree, adding or removing cells from an area when needed. Because of roaming, the MSSS 410 may want to wait for a predetermined amount of time before retiring a cell from a multicast session.

In one embodiment, the MSSS 410 will inform the AS 420 on any modification that it has made to a multicast session. It is possible that the MSSS 410 may decide to tear down the multicast session to a particular cell even if there are UEs 270 actively receiving traffic for a particular session. As an example, this may happen if there are only a few UE's 270 actively receiving multicast traffic for a session in a particular cell and it may be more efficient to support these UEs 270 using unicast. Another example is a case where there may be a lot of high priority multicast sessions at a cell and the lower priority sessions may have to be torn down.

The AS 420 can initiate the tearing down of a session by sending a command to the MSSS 410. When the command is received, the MSSS 410 informs the BM-SC 210 to tear down the session. The BM-SC 210 would then tear down the multicast session using the M2 and M3 interface protocol.

The MSSS 410 may want to tear down a session due to variety of reasons (e.g., not enough UEs 270 at a cell, etc.). In one embodiment, the MSSS 410 may inform the AS 420 that it would like to tear down a session. The AS 420 may then respond by sending a session tear down command to the MSSS 410.

In various instances, initially there may only a few UEs 270 subscribing to its service, and it may be more efficient for the AS 420 to send data to these UEs 270 using unicast. When there are sufficient UEs 270 subscribing to the service in an area, the AS 420 may then set up a parallel multicast session over the LTE network, and the UEs 270 can then switch from unicast to multicast to receive the data. For example, many multicast applications involve the distribution of media information (e.g., video, voice, etc.). Media information is usually encapsulated in RTP (Real Time Protocol, RFC 3550), where the header of an RTP packet contains a sequence number. As such, the sequence number can be used to facilitate a handover between unicast and multicast (or vice versa), without loss of data. If the higher layer protocol does not support a sequence number, a sequence number can be inserted, for example, between the IP header and the payload.

Figure 6:
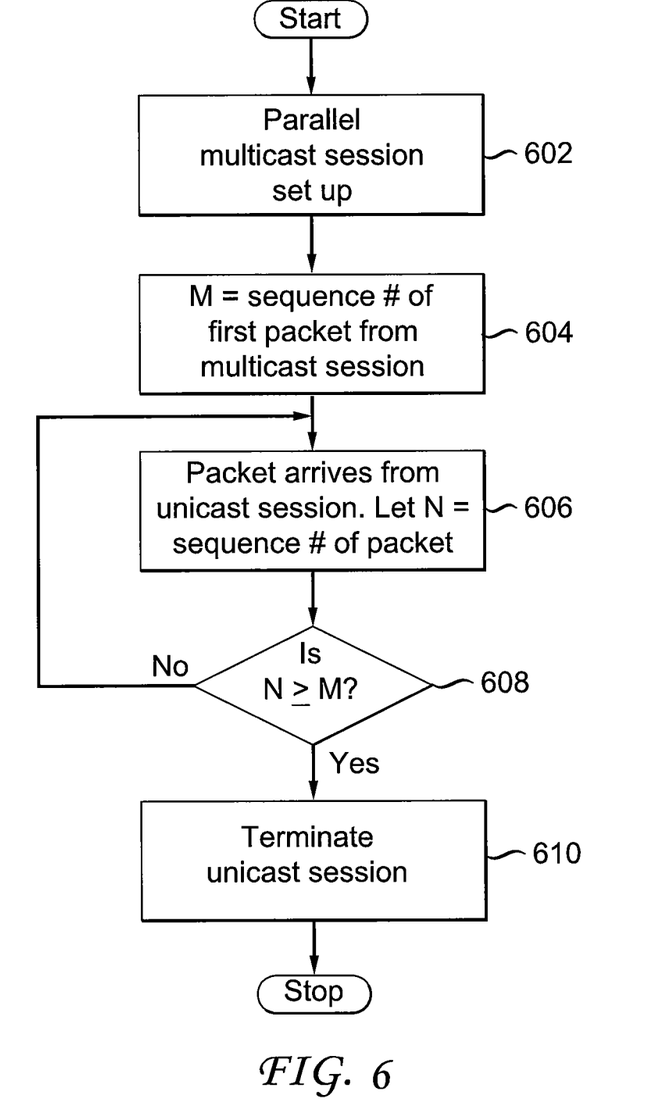
FIG. 6 is a flowchart showing the hand-off between a pre-existing and parallel transmission session.

FIG. 6 is a flowchart showing the hand-off between a pre-existing and parallel transmission session. In one embodiment, the pre-existing transmission session is a unicast session and the parallel session is a multicast session. However, it will be appreciated that as the number of UEs 270 subscribing to a particular multicast session decreases, it may be more efficient to terminate the multicast session and support the remaining UEs 270 using unicast sessions. As such, the steps below may be used for hand-off from a multicast session to unicast session (The role of the multicast session and unicast session will be reversed). Further, the same steps may also be used to switch from a unicast session to another unicast session or from one multicast session to another multicast session.

At step 602, while at least one UE 270 is receiving packets from the eNodeB base station for a unicast session, a parallel multicast session transmitting the same packet streams is set up, allowing the UE 270 to receive packets from both sessions. For example, it is possible that the UE 270 will receive duplicate copies of a packet. In such case, the sequence number can be used to eliminate duplicates.

At step 604, the MSSS 410 stores the value of the sequence number of the first RTP packet received over the multicast session, M, in its memory. Likewise, the MSSS 410 also stores the sequence number of the next received RTP packet, N, from the unicast session at step 606.

At step 608, the MSSS 410 compares the value of N and M. If N≥M, then the MSSS 410 can terminate the unicast session at step 610 and packets may be received solely from the multicast session. If N<M, the MSSS 410 goes back to step 606 to record the sequence number of the next received RTP packet, N, from the unicast session.

In various embodiments, it may take longer to set up a multicast session than a unicast session. For example, the set up time of multicast session for a LTE network may not meet the performance objective of an application. In this case, the MSSS 410 may set up individual unicast sessions to all the UE 270 subscribers first, before attempting to set up a multicast session. For example, the unicast session will be set up and a UE 270 will receive packets from the unicast session. When the multicast session is set up, the method described in FIG. 6 may be used for a hand-over. As such, from the perspective of the user, session set up time of the multicast session would be viewed as the same as a unicast session.

For some multicast applications, such as a push-to-talk group for a public safety agency, there may be a large number of UEs 270 joining a talk group at the same time. Under this scenario, it may not efficient to set up unicast sessions to all the UEs 270 initially. Therefore, in one embodiment a default multicast bearer may be permanently set up, sized to support a few talk groups, covering an entire MBSFN synchronous area(s). The MSSS 410 may send information to the UE 270 on both the default and the dedicated multicast sessions while the MSSS 410 sets up a dedicated multicast session as described above. For example, the AS 420 may initially send application layer packets using the default multicast bearer. Once the dedicated multicast session is set up, the AS 420 may then send the packets over both sessions while the MSSS 410 implements the hand-off described in FIG. 6. The MSSS 410 may then terminate transmissions on the default session after the hand-off is completed.

In another embodiment, all multicast sessions may be supported over the default multicast bearer (one per AS). For example, the bearer may initially be sized to support a number of session, for example, two or three (2 or 3) sessions. As the AS 420 initiates new multicast sessions, the MSSS 410 may increase the size of the bearer so that there is always headroom (e.g., 2-3 sessions) to accommodate new session setup. The size of the bearer will decrease as multicast sessions are torn down. Since all the sessions may use the same bearer, they may all have the same coverage. Alternatively, if a separate dedicated bearer is used to support each session, each bearer could have a different coverage area. In one embodiment, the default multicast bearer would be only used for a short time at the initial set up of the dedicated multicast bearer. Therefore, the resources allocated to this bearer could be just enough to support the exemplary two-to-three (2-3) sessions.

The various embodiments specify an innovative architecture and the associated procedures that address the support of IP multicast over an LTE network. Specifically, the embodiments provide for allowing an external entity (i.e., an application server) to dynamically request set-up of IP multicast over an LTE region. Although IP multicast is used, the IP network between the AS and the BM-SC does not need to support IP multicast. This will free up resources at the routers and the routers can achieve better throughput. Further, the LTE network can be assigned to the IP multicast address for a particular session, ensuring that there is no IP multicast address collision within the eMBMS serving area of the LTE network. This alleviates the need of the AS 420 to ensure that the IP multicast address it assigns to a channel will not collide with assignments by other application servers. In addition, further of the embodiments may provide authentication access by the AS 420 to the BM-SC 210 and simplify filtering by the BM-SC 210.

It will be appreciated that while each of the components of an eMBMS network may be implemented as discrete entities in the various embodiments, they may also be implemented as logical components. For example, the MCE 250 can be realized as a module within an eNodeB base station 260. Also, the BM-SC 210 and the MBMS GW 240 may be implemented within a single physical unit.

It will also be appreciated that the MSSS 410 is a logical module and can be implemented in a number of ways. For example, the MSSS 410 may be implemented as part of the Policy and Charging Rule Function (PCRF). The interface between an AS 420 and PCRF in an LTE network is an Rx interface. If the MSSS 410 is implemented as part of the PCRF, the BM-SC 210 will act as a Policy and Charging Rule Enforcement Function (PCEF) under the PCRF architecture. The control interface between the PCRF and PCEF is the Rx interface in LTE networks. The MSSS 410 may also be implemented as a logical module independent of the PCRF structure.

The current LTE standard specifies SFN as the technology for transmissions of broadcast/multicast packets at the physical layer, and the embodiments herein are generally described in terms of SFN. However, the embodiments herein are independent of the transmission technology used. As such, other multicast transmission technologies may be used instead of SFN for setting up a multicast bearer, the smooth hand over from one type of session to another and the various other embodiments.

Figure 7:
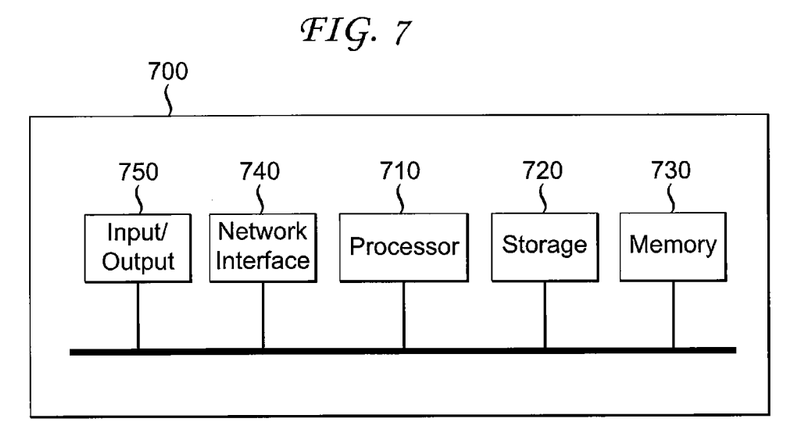
FIG. 7 is a high-level block diagram of an exemplary computer that may be used for implementing a shared-license management system.

The above-described methods may be implemented on a computer using well-known computer processors, memory units, storage devices, computer software, and other components. A high-level block diagram of such a computer is illustrated in FIG. 7. Computer 700 contains a processor 710, which controls the overall operation of the computer 700 by executing computer program instructions which define such operation. The computer program instructions may be stored in a storage device 720 (e.g., magnetic disk) and loaded into memory 730 when execution of the computer program instructions is desired. Thus, the steps of the method of FIGS. 3, 5 and 6 may be defined by the computer program instructions stored in the memory 730 and/or storage 720 and controlled by the processor 710 executing the computer program instructions. The computer 700 may include one or more network interfaces 740 for communicating with other devices via a network for implementing the steps of the method of FIGS. 3, 5 and 6. The computer 700 may also include other input/output devices 750 that enable user interaction with the computer 700 (e.g., display, keyboard, mouse, speakers, buttons, etc.). One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A method comprising:
    joining an IP multicast group in response to receiving a request to initiate an IP multicast transmission session within a network, the request including at least one pre-existing unicast transmission session parameter;
    determining at least one synchronization area within the network for the IP multicast transmission session of the request based at least in part on the at least one pre-existing unicast transmission session parameter;
    determining at least one multicast session parameter based at least in part on the at least one pre-existing unicast transmission session parameter; and
    initiating an IP multicast transmission session between an application server and at least one user equipment end-point within the at least one synchronization area and based on the at least one multicast session parameter.

2. The method of claim 1, further comprising initiating an IP multicast group in response to the request.

3. The method of claim 1, wherein the network supports IP multicast between the application server and the at least one synchronization area for the IP multicast transmission session.

4. The method of claim 1, further comprising instructing the establishment of a tunnel between the application server and the at least one synchronization area for the IP multicast transmission session.

5. The method of claim 1, further comprising transmitting configuration information regarding the IP multicast transmission session to at least one user equipment end-point within the network.

6. The method of claim 1, further comprising receiving location information for a first user equipment end-point within the network, wherein the location information may be used to modify a coverage area of the at least one synchronization area.

7. The method of claim 1, wherein the at least one synchronization area comprises a multimedia broadcast single frequency network.

8. The method of claim 1, wherein initiating an IP multicast transmission session comprises:
    initiating a parallel transmission session to a pre-existing transmission session within a network, wherein at least one communication packet is transmitted in both the pre-existing transmission session and the parallel transmission session; and the method further comprises:
    determining to hand-off transmitting packet streams from the pre-existing transmission session to the parallel transmission session when a hand-off condition is achieved.

9. The method of claim 8, further comprising:
    storing a sequence number for a first packet of the parallel transmission session; and
    storing a sequence number for a received packet of the pre-existing transmission session;
    wherein determining to hand-off comprises comparing values of the stored sequence numbers.

10. The method of claim 9, wherein the hand-off condition is achieved when the stored sequence number of the pre-existing transmission session is greater than or equal to the stored sequence number of the parallel transmission session.

11. The method of claim 9, further comprising storing a sequence number of a next received packet of the pre-existing transmission session when the stored sequence number from the pre-existing transmission session is less than the stored sequence number from the parallel transmission session.

12. The method of claim 8, further comprising terminating the pre-existing transmission session when the hand-off condition is achieved.

13. The method of claim 8, further comprising establishing an initial unicast or a default multicast transmission session as the pre-existing transmission session.

14. A server comprising a processor and a memory device, the processor configured to:
    join an IP multicast group in response to receiving a request to initiate an IP multicast transmission session within a network, the request including at least one pre-existing unicast transmission session parameter;
    determine at least one synchronization area within the network for the IP multicast transmission session of the request based at least in part on the at least one pre-existing unicast transmission session parameter;
    determine at least one multicast session parameter based at least in part on the at least one pre-existing unicast transmission session parameter; and
    initiate an IP multicast transmission session between an application server and at least one user equipment end-point within the at least one synchronization area and based on the at least one multicast session parameter.

15. The server of claim 14, wherein the processor is further configured to initiate an IP multicast group in response to the request.

16. The server of claim 14 wherein the network supports IP multicast between the application server and the at least one synchronization area for the IP multicast transmission session.

17. The server of claim 14, wherein the processor is further configured to instruct the establishment of a tunnel between the application server and the at least one synchronization area for the IP multicast transmission session.

18. The server of claim 14, wherein the processor is further configured to transmit configuration information regarding the IP multicast transmission session to at least one user equipment end-point within the network.

19. The server of claim 14, wherein the processor is further configured to receive location information for a user equipment end-point within the network, wherein the location information may be used to modify a coverage area of the at least one synchronization area.

20. The server of claim 14, wherein the at least one synchronization area comprises a multimedia broadcast single frequency network.

21. The server of claim 14, wherein the processor is further configured to:
    initiate a parallel transmission session to a pre-existing transmission session within a network, wherein at least one communication packet is transmitted in both the pre-existing transmission session and the parallel transmission session; and
    hand-off transmitting packet streams from the pre-existing transmission session to the parallel transmission session when a hand-off condition is achieved.

22. The server of claim 21, wherein the processor is further configured to:

store a sequence number for a first packet of the parallel transmission session;

store a sequence number for a received packet of the pre-existing transmission session; and compare the stored sequence numbers to determine whether the hand-off condition is achieved.

23. The server of claim 22, wherein the hand-off condition is achieved if the stored sequence number of the pre-existing transmission session is greater than or equal to the stored sequence number of the parallel transmission session.

24. The server of claim 22, wherein the processor is further configured to store a sequence number of a next received packet of the pre-existing transmission session if the stored sequence number from the pre-existing transmission session is less than the stored sequence number from the parallel transmission session.

25. The server of claim 21, wherein the processor is further configured to terminate the pre-existing transmission session when the hand-off condition is achieved.

26. The server of claim 21, wherein the processor is further configured to establish an initial unicast transmission session or a default multicast transmission session as the pre-existing transmission session.

27. An article of manufacture including a non-transitory computer-readable medium having instructions stored thereon, that in response to execution by a computing device causes the computing device to perform operations comprising:

joining an IP multicast group in response to receiving a request to initiate an IP multicast transmission session within a network, the request including at least one pre-existing unicast transmission session parameter;

determining at least one synchronization area within the network for the IP multicast transmission session of the request based at least in part on the at least one pre-existing unicast transmission session parameter;

determining at least one multicast session parameter based at least in part on the at least one pre-existing unicast transmission session parameter; and initiating an IP multicast transmission session between an application server and at least one user equipment endpoint within the at least one synchronization area and based on the at least one multicast session parameter.

* * * * *